(12) United States Patent
Kaska et al.

(10) Patent No.: US 6,710,566 B2
(45) Date of Patent: Mar. 23, 2004

(54) METHOD AND APPARATUS FOR SERVO GLUE GAP CONTROL

(75) Inventors: Robert E. Kaska, Saint Charles, IL (US); John R. Semenske, Lake Geneva, WI (US)

(73) Assignee: Chicago Industrial Group, Inc., Addison, IL (US)

( * ) Notice: Subject to any disclaimer, the term of this patent is extended or adjusted under 35 U.S.C. 154(b) by 58 days.

(21) Appl. No.: 09/968,699

(22) Filed: Oct. 1, 2001

(65) Prior Publication Data
US 2003/0067279 A1 Apr. 10, 2003

(51) Int. Cl.[7] .......................... G05B 11/01; B31F 1/20; B31F 5/00
(52) U.S. Cl. ........................ 318/560; 156/578; 156/555; 156/356; 156/462
(58) Field of Search .................. 318/560, 565, 318/567, 566.1, 630, 686, 10, 282, 266; 156/578, 538, 555, 356, 462; 118/249

(56) References Cited

U.S. PATENT DOCUMENTS

| | | | |
|---|---|---|---|
| 4,059,474 A | 11/1977 | Coburn | 156/356 |
| 4,319,947 A * | 3/1982 | Tokuno | 156/351 |
| 4,325,015 A * | 4/1982 | Heiberger | 318/625 |
| 4,351,264 A | 9/1982 | Flaum et al. | 118/203 |
| 5,129,980 A | 7/1992 | Sissons | 156/470 |
| 5,248,362 A | 9/1993 | Sissons | 156/205 |
| 5,348,612 A | 9/1994 | Buetikofer et al. | 156/578 |
| 5,434,489 A * | 7/1995 | Cheng et al. | 318/568.15 |
| 5,659,480 A * | 8/1997 | Anderson et al. | 700/186 |
| 5,684,374 A * | 11/1997 | Chaffee | 318/616 |
| 5,840,150 A * | 11/1998 | Brown | 156/324 |

FOREIGN PATENT DOCUMENTS

| | | | | |
|---|---|---|---|---|
| EP | 0786329 A | * | 7/1997 | B31F/1/28 |
| GB | 2034608 A | * | 6/1980 | B05C/11/04 |
| JP | 06134386 A | * | 5/1994 | B05D/1/28 |
| JP | 08267620 A | * | 10/1996 | B31F/1/24 |

OTHER PUBLICATIONS

Web page from United Container Machinery—Wet End Eagle Double Gluer Information, Apr. 26, 2000.

* cited by examiner

*Primary Examiner*—Robert Nappi
*Assistant Examiner*—Edgardo San Martin
(74) *Attorney, Agent, or Firm*—McAndrews Held & Malloy, Ltd.

(57) ABSTRACT

A servo control system for adjusting adhesive film thickness on a glue machine glue roll, wherein the glue machine includes a glue roll, a metering roll, and a glue gap defined between the glue roll and the metering roll. The system includes a servo motor for driving a glue gap adjusting mechanical linkage, a position encoder integrated into the servo motor, and a servo position controller coupled to the position encoder.

22 Claims, 2 Drawing Sheets

METHOD AND APPARATUS FOR SERVO GLUE GAP CONTROL

BACKGROUND OF THE INVENTION

The present invention relates to glue gap control in glue machines. In particular, the present invention relates to automated servo control of the gap between a glue roll and a metering roll in a glue machine to achieve a desired adhesive film thickness on the glue roll.

Glue machines find widespread use in the construction of packing materials, including, for example, corrugated paperboard. In one type of corrugated paperboard construction process, a first single faced sheet of corrugated paperboard moves through a glue machine that applies glue to flute tips of the single faced sheet. Subsequently, a second opposing sheet of corrugated paperboard is mated by the applied glue to the first sheet to form a doublebacked sheet of corrugated paperboard. The doublebacked sheet may then be formed into boxes, tubes, and other packing containers.

The glue machine typically incorporates a glue roll with a surface that rotates through a glue reservoir to pickup or accumulate glue. A metering mechanism adjacent to the glue roll attempts to restrict the adhesive film thickness present on the glue roll (and thus the amount of glue applied to the first sheet of corrugated paperboard). The metering mechanism may vary between glue machines, and may be a glue roll, a scraper blade, or the like.

Generally, the most significant factor in controlling the adhesive film thickness (and thus the amount of glue applied to the first sheet of corrugated paperboard) is the glue gap size. The glue gap size is the distance between the metering mechanism and the glue roll. The glue gap size has a direct influence on the adhesive film thickness on the glue roll, and as a result, is an extremely important parameter in ensuring that the glue roll applies the appropriate amount of glue to the first sheet.

In the past, however, glue machines did not exercise precise control over the glue gap. As one example, some prior glue machines incorporated a hand wheel that an operator used to vary the size of the glue gap. Not only was operator adjustment of the hand wheel relatively inexact, but it also required the operator to manually inspect the resulting amount of glue applied to the first sheet of corrugated paperboard. Thus, manual adjustment of the hand wheel generally was not undertaken more than once or twice per day, and often resulted in application of an inappropriate amount of glue to the first sheet.

In particular, the glue roll generally applied too much glue for most applications. With too much glue between the first and second sheets of corrugated paperboard, the paperboard took far longer to dry than it would have given an appropriate amount of applied glue. Furthermore, a glue roll that overapplied glue was wasteful and also increased the cost of producing the doublebacked sheet of corrugated paperboard.

Another attempt at glue gap control included providing a reversible AC motor, encoder, and programmable logic controller (PLC). In turning under control of the PLC, the AC motor, coupled to the glue roll through a mechanical linkage, adjusted the size of the glue gap. Such approaches used low resolution encoders and thus were relatively inexact as well. Furthermore, the PLC and encoder added significantly to the cost of implementing this type of glue gap control. Additionally, sophisticated control and feedback of the motor acceleration, velocity, position, torque, and the like, at each point in time (useful, for example, for compensating for mechanical slop and sensing jams) were not available.

A need has long existed in the industry for a method and apparatus for glue gap control that addresses the problems noted above and others previously experienced.

BRIEF SUMMARY OF THE INVENTION

A preferred embodiment of the present invention provides a servo control system for adjusting adhesive film thickness on a glue machine glue roll. The control system includes a servo motor for driving a glue gap adjusting mechanical linkage, a position encoder coupled to the servo motor, and a servo position controller coupled to the position encoder. In addition, an operator control interface coupled to the servo position controller directs the operation of the servo motor.

In one embodiment, the operator control interface includes a processor and a memory storing instructions for execution by the processor. The instructions are responsive to position encoder feedback for turning the servo motor to achieve a desired glue gap size. Optionally, the instructions may turn the servo motor in accordance with a selected velocity profile for the servo motor. The velocity profile typically specifies servo motor velocity between a start position (e.g., a current glue gap size) and an end position (e.g. the desired glue gap size).

The control system may determine the desired glue gap size as a function of many glue machine parameters. The function, however, is preferably an approximately linear function of the glue machine line speed. Alternatively, the control system may consult a preprogrammed lookup table of glue machine line speeds, desired adhesive film thickness, glue gap sizes, and other parameters to determine the desired glue gap size.

Using feedback from the position encoder, the control system may turn the motor to achieve the desired glue gap size, then back away from the desired glue gap size, then turn back into the desired glue gap size. In this manner, the control system may compensate for gear backlash or mechanical slop. Furthermore, the memory may store instructions that monitor a servo motor torque feedback signal for jam sensing.

DETAILED DESCRIPTION OF THE INVENTION

Figure 1:
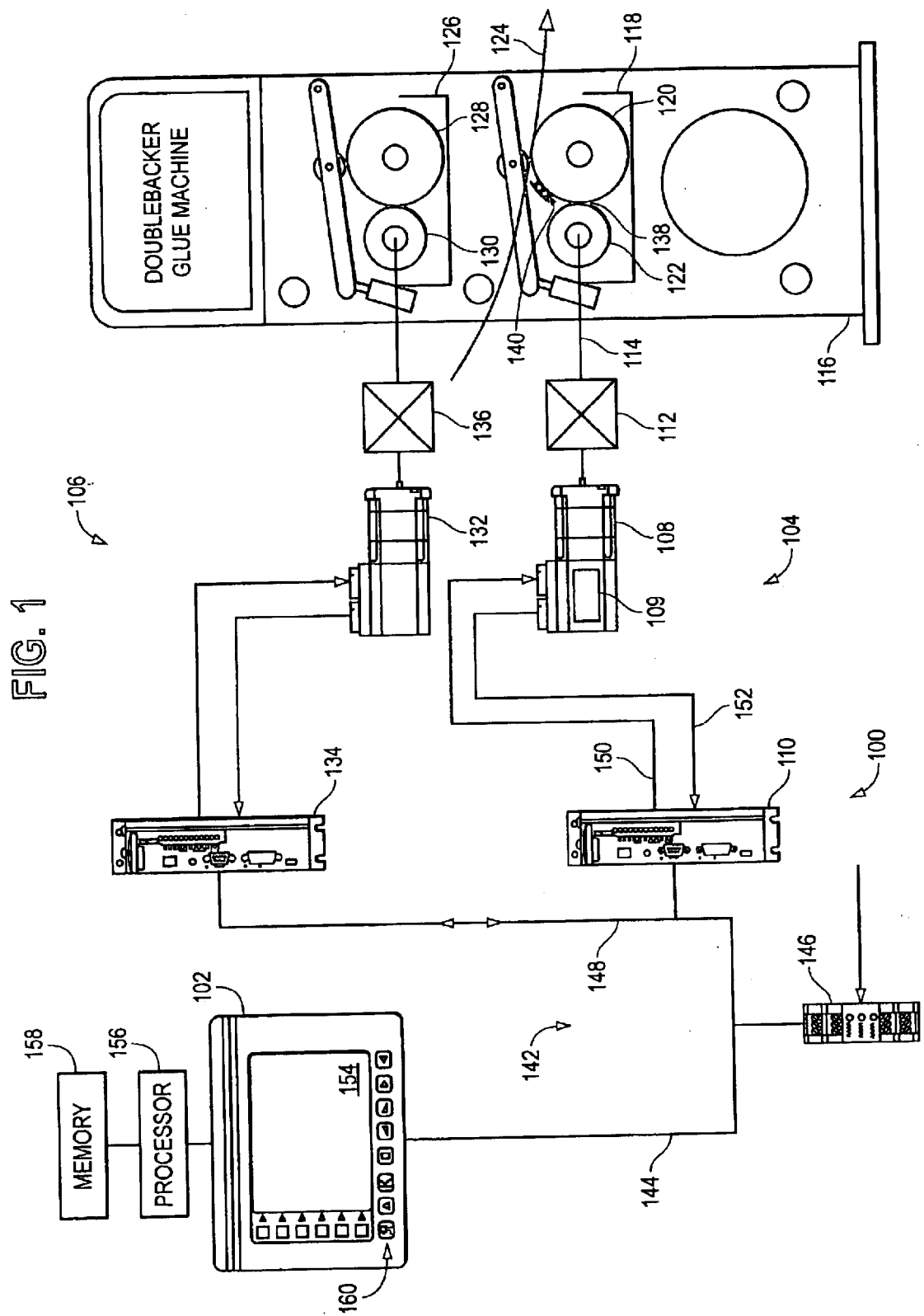
FIG. 1 illustrates a hardware diagram of a servo control system for adjusting adhesive film thickness on a glue machine glue roll.

Turning now to FIG. 1, there is shown a hardware diagram of a servo control system 100. The control system 100 includes an operator control interface 102, first line control components 104, and second line control components 106. The first line control components include a servo motor 108 (with integrated position encoder 109), and a servo position controller 110. The servo motor 108 couples through a gear reducer 112 to a glue gap adjusting mechanical linkage 114 (e.g., a rotating actuator on an eccentric) to the glue machine 116.

The glue machine 116 includes, for the first line, an adhesive pan 118, a glue roll 120, and a metering roll 122. A sheet of paperboard moves through the glue machine 116 as generally indicated by the arrow 124 at a predetermined glue machine line speed. The glue machine 116 includes, for the second line, an adhesive pan 126, a glue roll 128, and a metering roll 130. The second line control components 106 provide independent glue gap control for the second line. In particular, the second line control components 106 include a servo motor 132, servo position controller 134, and gear reducer 136.

Although the discussion below proceeds with reference to the first line control components 104, it is noted that the second line control components 106 function in substantially the same manner. Furthermore, although the glue machine 116 is shown with two independent lines, a glue machine with additional or fewer lines may be used. Additionally, the metering roll is illustrated as one exemplary metering mechanism and may be replaced with a scraper blade or the like.

The glue gap (i.e., the distance between the metering roll 122 and the glue roll 120) is illustrated with reference label 138. The adhesive film thickness, exaggerated for clarity, is illustrated with reference label 140.

The operator control interface 102 is coupled to the servo position controller 110 over the communication bus structure 142. The communication bus structure 142 may be implemented, for example, as an RS422 segment 144 that connects the operator control interface 102 to the ModBus™ conditioner 146, and a ModBus™ segment 148 that connects the ModBus™ conditioner 146 to the servo position controller 110. In other words, the ModBus™ conditioner 146 translates communications between the servo controller 110 and the operator control interface 102. No particular communication bus structure is required, however, and as other examples, the communication bus structure 142 may be implemented as a serial, parallel, or general purpose industrial network bus structure.

The servo position controller 110 issues control signals to the servo motor 108 over the control link 150. The servo motor 108, in turn, communicates with the servo position controller 110 over the response link 152. Thus, for example, the control link 150 carries signals that cause the servo motor 108 to turn, while the response link 152 provides associated feedback, including position encoder counts, quadrature encoder signals, torque signals or measurements, servo motor speed signals or measurements, acceleration signals or measurements, and the like. Alternatively, the servo controller 110 or the operator control interface 102 may derive in a known manner servo motor speed, torque, acceleration, and the like from position encoder signals provided by the response link 152.

As examples, the ModBus™ conditioner 146 may be a Red Lion Analog to ModBus converter, the servo position controller 110 may be an Emerson Ei-202 servo drive, and the servo motor 108 may be an Emerson NT-207-C servo motor (with integrated position encoder 109). The gear reducer 112 may be a Neugart PLE-60-100 gear box providing 100:1 gear reduction.

Preferably, the servo motor position encoder 109 is a high resolution position encoder. For example, the position encoder may provide greater than 1000 pulses per servo motor 108 revolution, and preferably 4000 or more pulses per servo motor 108 revolution. The gear reducer 112 multiplies torque and resolution by at least a factor of 100, preferably. The mechanical linkage 114 is coupled to the servo motor 108 and responds to servo motor rotation to open or close the glue gap 138. To this end, the mechanical linkage 114 may be implemented, for example, as a rotating actuator coupled to an eccentric linked to the metering roll 122. Other mechanical linkages may be substituted, however, as long as they are responsive to servo motor 108 rotation to open or close the glue gap 138.

The operator control interface 102 generally includes a touchscreen 154, a processor 156, a memory 158, and interface buttons 160. The processor 156 may be a general purpose processor, microcontroller, or embedded controller, and operates under general program control of the instructions in the memory 158. The memory 158 generally comprises a section of nonvolatile memory (e.g., Flash memory, hard disk memory, EEPROM, and the like) and volatile memory (e.g., RAM). The processor 156 generally responds to operator selections (e.g., an explicit glue gap size input selection) on the touchscreen 154 or interface buttons 160. Thus, the operator may adjust adhesive film thickness by directly specifying the glue gap 138 size, may setup or initialize control system 100 parameters (e.g., enter control system 100 parameters such as line speed, setup gap profiles, and enable compensation for gear backlash), and the like.

Thus, for example, the glue gap 138 may be calibrated initially by storing in the memory 158 for the processor 156 the measured glue gap 138 size, metering roll 122 position, the relationship between encoder pulses and glue gap size change, and the like. Because each encoder pulse corresponds to a known change in the glue gap 138 size, the processor 156 may open and close the glue gap a desired amount by turning the servo motor 108 and monitoring the position encoder 109 output.

The processor 156 may be programmed to automatically determine a desired glue gap size, G, based on one or more system parameters, examples of which are shown in Table 1.

TABLE 1

| Parameter | Definition |
| --- | --- |
| $D_G$ | Glue roll diameter |
| $D_M$ | Metering roll diameter |
| $N_L$ | Line speed |
| $N_G$ | Glue roll speed |
| $N_M$ | Metering roll speed |
| V | Adhesive viscosity |
| A | Adhesive film thickness |
| T | Adhesive type |
| P | Paper Grade |

For example, the processor 158 may implement an approximately linear model for glue gap G as a function of line speed $N_L$. For example, for an initial glue gap setting of 0.020 inches at a line speed $N_L$ of 200 feet/minute, the processor could be programmed to linearly decrease the glue gap by 0.002 inches for every 100 feet/minute increase in lines speed, down to a minimum gap of 0.008 inches at 800 feet per minute.

Alternatively, the memory 158 may store one or more lookup tables (i.e., a "gap profile") that specify the desired glue gap size based on one or more of the parameters shown in Table 1. Table 2 shows an example of a gap profile for achieving a constant adhesive thickness, A, in the face of variations in line speed, $N_L$. Thus, as the line speed is increased or decreased, the glue gap size may be increased or decreased to maintain a constant adhesive thickness.

TABLE 2

Gap Profile
Glue gap size to maintain a predetermined constant adhesive thickness, A

| Line Speed, $N_L$ (fpm) | Glue gap size, G (inches) |
| --- | --- |
| 200 | 0.019 |
| 300 | 0.017 |
| 400 | 0.014 |
| 500 | 0.011 |
| 600 | 0.009 |

The memory 158 may include a plurality of such gap profile tables for different paper grades. Moreover, the processor may be programmed to allow the operator to build gap profile tables based on practical experience.

Figure 2:
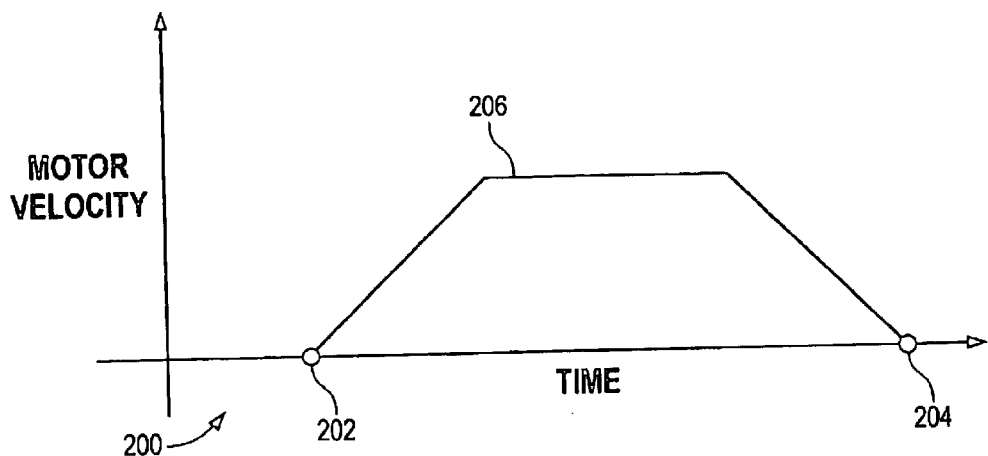
FIG. 2 shows a velocity profile for a servo motor.

Note that in controlling the glue gap 138 size, the processor 156 may exercise continuous control over the servo motor 108 according to a velocity profile. Turning to FIG. 2, that figure illustrates one exemplary velocity profile 200. The velocity profile 200 illustrates servo motor 108 velocity 206 over time from a start position 202 (e.g., an initial glue gap size) to an end position 204 (e.g., a desired glue gap size).

The velocity profile 200 need not adhere to any mandatory shape, but may be freely designed to accommodate physical characteristics and considerations of the glue machine 116, servo motor 108, gear reducer 112, mechanical linkage 114, and the like. Thus, for example, the velocity profile 200 provides a linear servo motor speed ramp-up and ramp-down that avoid sudden sharp stresses to the servo motor when accelerating and decelerating.

Additionally, the processor 158 may compensate for mechanical slop and gear backlash in the glue machine 116. To this end, the processor 158 may turn the motor until the desired glue gap is achieved, back the metering roll 122 out a backout distance of 0.0005 to 0.0015 inches, for example, then turn the motor to move the metering roll 122 back in to reach the desired glue gap size. The backout distance will vary from glue machine to glue machine, and over the life of a single glue machine, but may in general be determined through observation and measurement, for example, during control system 100 calibration. The backout distance may be stored in the memory 158 for retrieval by the processor 156.

As noted above, the servo motor 108 may provide torque feedback to the operator control interface 102 through the position controller 110. Thus, the processor 156 may monitor the torque feedback signal to sense a jam between the servo motor 108 and the glue roll 120. Thus, for example, when the processor 156 measures or computes a torque signal above a predetermined maximum torque threshold (stored in the memory 158) for the glue machine 116, the processor 158 may stop turning the servo motor 108 and alert the operator to the possible presence of a jam.

Figure 3:
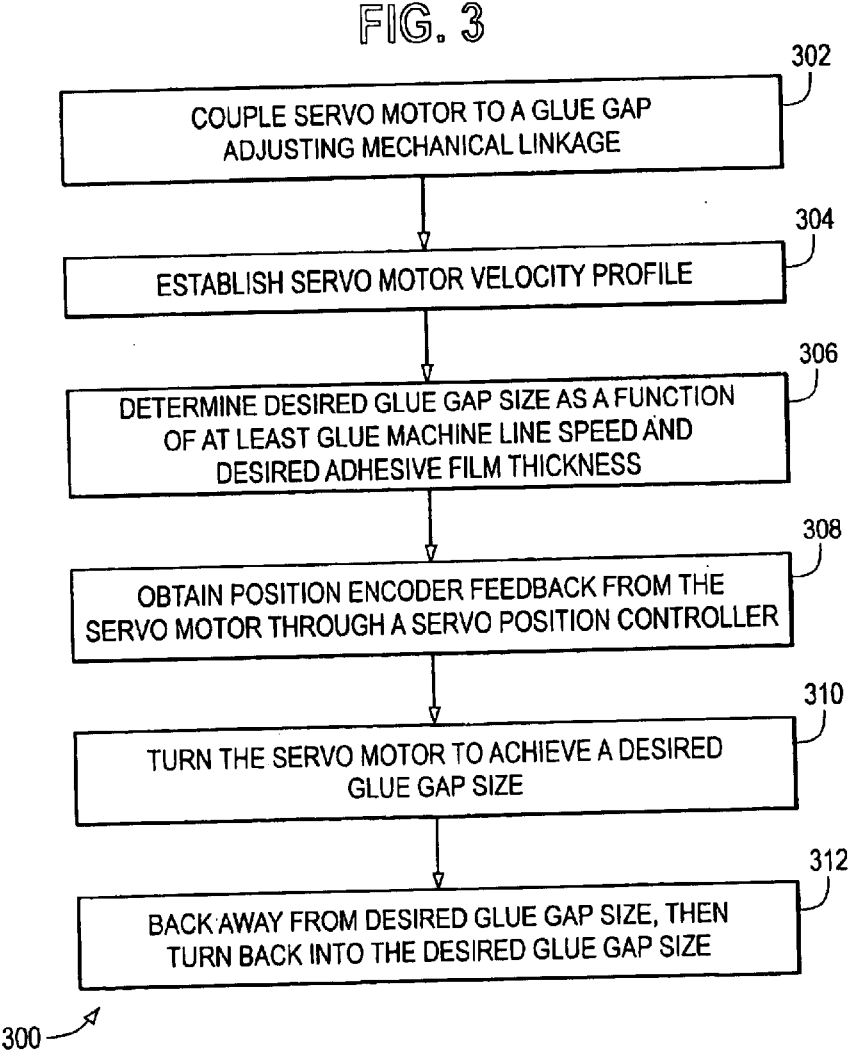
FIG. 3 illustrates a method for adjusting adhesive film thickness on a glue machine glue roll.

Turning next to FIG. 3, that figure illustrates a flow diagram 300 that summarizes steps executed by the servo control system 100 in adjusting adhesive film thickness on a glue machine glue roll. First, the servo motor is coupled (302) to a glue gap adjusting mechanical linkage. Next, the servo control system 100 optionally establishes (304) a servo motor velocity profile and determines (306) the desired glue gap size as a function of at least glue machine line speed and desired adhesive film thickness. As noted above, however, an operator may instead explicitly enter a desired glue gap size using the operator control interface 102.

Subsequently, the servo control system 100 obtains (308) position encoder feedback from the servo motor 108 through the position controller 110. While monitoring the feedback, the servo control system 100 turns (310) the servo motor to achieve the desired glue gap size. As noted above, the servo control system 100 may compensate for gear backlash or mechanical slop by turning (312) away from the desired glue gap size, then turning back into the glue gap size.

Thus, the servo control system 100 provides a less complex, less costly, but highly accurate glue gap size control for regulating adhesive film thickness on a glue roll. An programmable logic controller, separate encoder card, supporting card cage, and the like are not required. Instead, the high resolution position encoder and servo motor provide precise adjustment of glue gap size, allow jam sensing and compensation for backlash in gears, and provide control over servo motor speed and acceleration on a continuous basis. Furthermore, the servo control system 100 may also be installed as a new feature on existing glue machines, thereby extending the life and usefulness of significant capital investments.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A servo control system for adjusting adhesive film thickness on a glue machine glue roll, the control system comprising:
   a servo motor for driving a glue gap adjusting mechanical linkage that responds to rotation of said servo motor to adjust a glue gap defined between a glue roll and a metering roll of a glue machine;
   a position encoder incorporated into the servo motor;
   a servo position controller coupled to the position encoder; and
   an operator control interface coupled to the servo position controller.

2. The control system of claim 1, wherein the operator control interface includes a processor and a memory storing instructions for execution by the processor, and wherein the instructions comprise instructions responsive to position encoder feedback for turning the servo motor to achieve a desired glue gap size.

3. The control system of claim 2, wherein the instructions further comprise instructions for turning the servo motor in accordance with a selected velocity profile.

4. The control system of claim 3, wherein the velocity profile specifies servo motor velocity between a start position and an end position.

5. The control system of claim 4, wherein the start position is a first glue gap size and wherein the end position is a second glue gap size.

6. The control system of claim 2, wherein the instructions further comprise instructions for determining the desired glue gap size as a function of a glue machine line speed.

7. The control system of claim 6, wherein the function is an approximately linear function of the glue machine line speed.

8. The control system of claim 2, wherein the instructions further comprise instructions for turning the motor to achieve the desired glue gap size, then backing away from the desired glue gap size, then turning back into the desired glue gap size to compensate for at least one of gear backlash and mechanical slop.

9. The control system of claim 2, wherein the instructions further comprise jam sensing instructions responsive to a servo motor torque feedback signal.

10. The control system of claim 1, further comprising a gear reducer coupled to the servo motor.

11. The control system of claim 10, wherein the gear reducer provides at least 100:1 gear reduction.

12. The control system of claim 1, wherein the position encoder outputs at least 4000 pulses per revolution of the servo motor.

13. A method for adjusting adhesive film thickness on a glue machine glue roll, the method comprising:

coupling a servo motor with an integrated position encoder to a glue gap adjusting mechanical linkage that responds to rotation of the servo motor to adjust a glue gap defined between a glue roll and a metering roll of a glue machine;

obtaining position encoder feedback from the servo motor through a servo position controller coupled to the position encoder; and turning the servo motor under control of an operator control interface to achieve a desired glue gap size.

14. The method of claim 13, wherein turning comprises turning the servo motor in accordance with a selected velocity profile for the servo motor.

15. The method of claim 13, wherein turning comprises turning the servo motor in accordance with a selected velocity profile specifying servo motor velocity between a start position and an end position.

16. The method of claim 13, further comprising determining the desired glue gap size as a function of a glue machine line speed.

17. The method of claim 16, wherein the function is an approximately linear function of the glue machine line speed.

18. The method of claim 13, further comprising backing away from the desired glue gap size, then turning back into the desired glue gap size to compensate for at least one of gear backlash and mechanical slop.

19. The method of claim 13, further comprising monitoring a servo motor torque feedback signal for jam sensing.

20. The method of claim 13, further comprising providing a gear reducer coupled to the servo motor.

21. A servo control system for adjusting adhesive film thickness on a glue machine glue roll, the control system comprising:

a servo motor for driving a glue gap adjusting mechanical linkage that responds to rotation of said servo motor to adjust a glue gap defined between a glue roll and a metering roll of a glue machine.

22. A method for adjusting adhesive film thickness on a glue machine glue roll, the method comprising:

coupling a servo motor with an integrated position encoder to a glue gap adjusting mechanical linkage that responds to rotation of the servo motor to adjust a glue gap defined between a glue roll and a metering roll of a glue machine.

* * * * *